United States Patent
Naribole et al.

(12)

(10) Patent No.: US 11,438,926 B2
(45) Date of Patent: Sep. 6, 2022

(54) METHOD AND SYSTEM FOR SIMULTANEOUS MULTI-CHANNEL DOWNLINK OPERATION IN WIRELESS LOCAL AREA NETWORK

(71) Applicant: Samsung Electronics Co., Ltd., Gyeonggi-do (KR)

(72) Inventors: Sharan Naribole, San Jose, CA (US); Srinivas Kandala, Morgan Hill, CA (US); Wook Bong Lee, San Jose, CA (US); Ashok Ranganath, Los Gatos, CA (US)

(73) Assignee: Samsung Electronics Co., Ltd

( * ) Notice: Subject to any disclaimer, the term of this patent is extended or adjusted under 35 U.S.C. 154(b) by 105 days.

(21) Appl. No.: 16/943,239

(22) Filed: Jul. 30, 2020

(65) Prior Publication Data

US 2021/0076340 A1 Mar. 11, 2021

Related U.S. Application Data

(60) Provisional application No. 62/898,470, filed on Sep. 10, 2019, provisional application No. 62/900,162, (Continued)

(51) Int. Cl.
*H04W 74/08* (2009.01)
*H04L 5/00* (2006.01)
(Continued)

(52) U.S. Cl.
CPC ....... *H04W 74/0808* (2013.01); *H04L 5/0055* (2013.01); *H04W 56/001* (2013.01); *H04W 84/12* (2013.01)

(58) Field of Classification Search
CPC .......... H04W 74/0808; H04W 56/001; H04W 84/12; H04W 74/0818; H04L 5/0055
See application file for complete search history.

(56) References Cited

U.S. PATENT DOCUMENTS

| 5,604,730 A | * | 2/1997 | Tiedemann, Jr. ... | H04W 52/343 370/252 |
| 10,506,553 B2 | | 12/2019 | Ahn et al. | |

(Continued)

OTHER PUBLICATIONS

Sharan Naribole et al., IEEE 802.11-19/1405r1 (Sep. 15, 2019) Multi-link Channel Access Discussion (https://mentor.ieee.org/802.11/dcn/19/11-19-1405-01-00be-multi-link-operation-channel-access-discussion.pptx), pp. 18.

(Continued)

*Primary Examiner* — Mohammad S Anwar
(74) *Attorney, Agent, or Firm* — The Farrell Law Firm, P.C.

(57) ABSTRACT

Methods and a devices are provided is for receiving simultaneous downlink transmissions at a mobile station (STA). Information regarding whether endings of simultaneous data transmissions to the mobile station are to be aligned is transmitted to an access point (AP). The simultaneous data transmissions are between the AP and the STA over a pair of channels. Reception begins of a first data transmission, from the AP, on a first channel of the pair of channels. Reception begins of a second data transmission, from the AP, on a second channel of the pair of channels. The second data transmission overlaps at least a portion of the first data transmission. Reception of the second data transmission ends upon an end of the first data transmission when the information indicates that the endings of simultaneous downlink data transmissions are to be aligned.

20 Claims, 6 Drawing Sheets

Related U.S. Application Data filed on Sep. 13, 2019, provisional application No. 62/928,271, filed on Oct. 30, 2019, provisional application No. 62/933,039, filed on Nov. 8, 2019, provisional application No. 62/947,955, filed on Dec. 13, 2019, provisional application No. 62/959,414, filed on Jan. 10, 2020, provisional application No. 62/989,386, filed on Mar. 13, 2020, provisional application No. 62/992,719, filed on Mar. 20, 2020, provisional application No. 63/021,069, filed on May 6, 2020.

(51) Int. Cl.
 *H04W 56/00* (2009.01)
 *H04W 84/12* (2009.01)

(56) References Cited

U.S. PATENT DOCUMENTS

| | | | |
|---|---|---|---|
| 10,542,526 | B2 | 1/2020 | Seok |
| 2007/0152053 | A1* | 7/2007 | Bik ...................... G06K 7/0008 235/451 |
| 2015/0009874 | A1* | 1/2015 | Edara .................... H04W 76/28 370/311 |
| 2018/0206143 | A1 | 7/2018 | Patil et al. |
| 2020/0037288 | A1 | 1/2020 | Huang et al. |

OTHER PUBLICATIONS

Boris Bellalta, IEEE 802.11ax: High-Efficiency WLANs, Dec. 2015, pp. 17.

Duncan Ho (Qualcomm), "MLA: Sync PPDUs", IEEE 802.11-20/0026r6, Mar. 14, 2020, 23 pages.

Yunbo Li (Huawei), "PPDU Alignment in STR Constrained Multi-link", IEEE 802.11-20/0433r5, Mar. 15, 2020, 19 pages.

Insun Jang (LG Electronics), "Method for Handling Constrained MLD", IEEE 802.11-20/0414r4, Mar. 16, 2020, 16 pages.

Yongho Seok (Mediatek), "Synchronous Multi-Link Operation", IEEE 802.11-19/1305r2, Mar. 26, 2020, 9 pages.

European Search Report dated Jan. 15, 2021 issued in counterpart application No. 20189819.4-1215, 11 pages.

\* cited by examiner

METHOD AND SYSTEM FOR SIMULTANEOUS MULTI-CHANNEL DOWNLINK OPERATION IN WIRELESS LOCAL AREA NETWORK

PRIORITY

This application is based on and claims priority under 35 U.S.C. § 119(e) to a U.S. Provisional Patent Application Nos. 62/898,470, 62/900,162, 62/928,271, 62/933,039, 62/947,955, 62/959,414, 62/989,386, 62/992,719, and 63/021,069 filed on Sep. 10, 2019, Sep. 13, 2019, Oct. 30, 2019, Nov. 8, 2019, Dec. 13, 2019, Jan. 10, 2020, Mar. 13, 2020, Mar. 20, 2020, and May 6, 2020, respectively, in the United States Patent and Trademark Office, the contents of which are incorporated herein by reference.

FIELD

The present disclosure relates generally to a wireless local area network (WLAN), and more particularly, to a method and a system for simultaneous multi-channel downlink operation in a WLAN.

BACKGROUND

A demand currently exists for improved throughput performance in existing MILAN applications and for lower latency and high-reliability applications over WLANs. Concurrently, devices (e.g., mobile stations (STAB) and access points (APs)) have been developed with multiple radios capable of operating simultaneously on multiple channels/links that may be distributed over multiple bands, such as, for example, 2.4 GHz, 5 GHz and 6 GHz. Multi-channel or multi-link operation in the same network (e.g., basic service set (BSS)) has the potential to improve the throughput, since frames from a traffic session may be transmitted on multiple channels providing increased bandwidth. This multi-channel operation also has the potential to reduce latency, since devices contend on multiple channels and utilize the first available channel. The multi-channel operation additionally has the potential to increase reliability, since frames may be duplicated over multiple channels. This multi-channel operation further has the potential to enable flexible channel/link switching without negotiation overhead. Multi-channel/multiband operation represents a paradigm shift, moving from the BSS operating on a single channel, to the BSS operating over multiple channels, in which STAs may dynamically choose to operate on a subset of channels ranging from a single channel to multiple channels.

In some forms of multi-channel operation, with respect to a pair of channels, it may be beneficial for the participating devices to have the capability to perform reception on one channel while simultaneously transmitting on the other channel (simultaneous transmit-receive (STR) capability). The STR capability on a pair of channels may be determined by several factors of radio design and BSS operation including, for example, channels of operation, bandwidth of each channel, transmit power limit, antenna distribution between the channels, etc. Therefore, a multi-radio device may lack SIR capability for particular channel combinations. If the AP itself lacks SIR capability, the multi-channel operation may be restricted, leading to negligible gain over legacy single-channel operation. Typically, AP devices are many-antenna systems and the AP establishes the channels of operation in the BSS. Therefore, the AP may select the channels of operation such that the AP has STR capability on every pair of channels in its BSS. In contrast, a STA might lack SIR capability for a particular set of operating channels due to a smaller form factor compared to the AP. STAs that lack STR capability are referred to as non-STR STAs With medium access being independent on each channel, using random contention-based mechanisms, an AP may obtain medium access on each channel in an asynchronous manner. Consequently, if simultaneous downlink transmissions that begin at different times are provided to the same non-SIR STA, an immediate acknowledgement response in the uplink on a first channel may overlap and ongoing downlink data transmission on a second channel. The term "overlap" refers to overlap in the time domain unless explicitly stated otherwise. Such overlap would lead to reception failure of downlink data at the non-SIR STA.

SUMMARY

According to one embodiment, a method is provided for receiving simultaneous downlink transmissions at a STA. The STA transmits information regarding whether endings of simultaneous data transmissions to the mobile station are to be aligned to an AP. The simultaneous data transmissions are between the AP and the STA over a pair of channels. The STA begins reception of a first data transmission, from the AP, on a first channel of the pair of channels. The STA begins reception of a second data transmission, from the AP, on a second channel of the pair of channels. The second data transmission overlaps at least a portion of the first data transmission. Reception of the second data transmission ends upon an end of the first data transmission, when the information indicates that the endings of simultaneous downlink data transmissions are to be aligned.

According to one embodiment, a method is provided for transmitting simultaneous downlink transmissions at an AP. The AP receives, from a STA, information regarding whether endings of simultaneous data transmissions to the STA are to be aligned. The simultaneous data transmissions are between the AP and the STA over a pair of channels. The AP begins transmission of a first data transmission, to the STA, on a first channel of the pair of channels. The AP begins transmission of a second data transmission, to the STA, on a second channel of the pair of channels. The second data transmission overlaps at least a portion of the first data transmission. The AP aligns a second ending of the second data transmission with a first ending of the first data transmission, when the information indicates that the endings of simultaneous data transmissions are to be aligned.

According to one embodiment, a STA is provided having a processor and a non-transitory computer readable storage medium storing instructions. When executed, the instructions cause the processor to: transmit, to an AP, information regarding whether endings of simultaneous data transmissions to the STA are to be aligned, where the simultaneous data transmissions are between the AP and the STA over a pair of channels; begin reception of a first data transmission, from the AP, on a first channel of the pair of channels; begin reception of a second data transmission, from the AP, on a second channel of the pair of channels, where the second data transmission overlaps at least a portion of the first data transmission; and end reception of the second data transmission upon an end of the first data transmission, when the information indicates that the endings of simultaneous data transmissions are to be aligned.

According to one embodiment, an AP is provided having a processor and a non-transitory computer readable storage medium storing instructions. When executed, the instructions cause the processor to: receive, from a STA, information regarding whether endings of simultaneous data transmissions to the STA are to be aligned, where the simultaneous data transmissions are between the AP and the STA over a pair of channels; begin transmission of a first data transmission, to the STA, on a first channel of the pair of channels; begin transmission of a second data transmission, to the STA, on a second channel of the pair of channels; where the second data transmission overlaps at least a portion of the first data transmission; align a second ending of the second data transmission with a first ending of the first data transmission, when the information indicates that the endings of simultaneous data transmissions are to be aligned.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
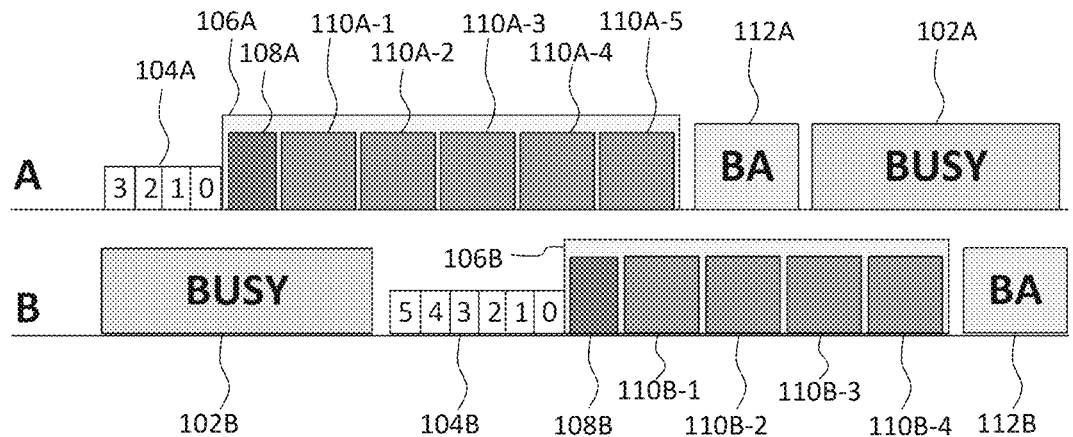
FIG. 1 is a diagram illustrating multichannel medium access by a device.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

An AP may establish a BSS operation over multiple channels. These channels may be disposed on different bands, although a subset of the channels may be disposed on the same band. Examples of a multi-channel BSS include a 20 MHz operation in a 2.4 GHz band, an 80 MHz operation in a 5 GHz band, and a 160 MHz operation in a 6 GHz band. Due to a diversity in channel conditions across the channels, a data rate used by a device may be different on different channels. The AP advertises the multi-channel operation in broadcast frames including, for example, beacons, probe responses, etc. STAs joining the BSS may indicate the channels they want to operate on during association and/or dynamically in the form of an operating mode change indication after association. For example, a STA may temporarily switch to single channel operation for power saving when it has no backlogged traffic or for co-existence with other technologies (e.g., Bluetooth). Herein, multi-channel operation is described over two channels, but is not limited thereto.

Medium access in each channel does not require synchronization between channels. FIG. 1 is a diagram illustrating multichannel medium access by a device operating on channels A and B. A channel may be considered to be in a busy channel state upon detecting an energy above an energy detection threshold. A first busy channel state 102A is shown on channel A, and a second busy channel state 102B is shown on channel B. A data transmission on a channel begins when a value of a backoff counter reaches zero. A first backoff counter 104A is shown on channel A, and a second backoff counter 104B is shown on channel B.

A single physical protocol layer data unit (PPDU) transmission consists of a physical (PHY) layer preamble and multiple media access control (MAC) layer data units (MPDUs). A first PPDU 106A is shown on channel A and includes a first PHY preamble 108A and a first set of MPDUs 110A-1 to 110A-5. A second PPDU 106B is shown on channel B and includes a second PHY preamble 108B and a second set of MPDUs 110B-1 to 110B-4. A corresponding immediate Block Ack includes a bitmap in which each bit acknowledges the successful reception of a corresponding MPDU. A first Block Ack 112A is shown on channel A in response to the reception of the first PPDU 106A, and a second Block Ack 112B is shown on channel B in response to the reception of the second PPDU 106B. FIG. 1 illustrates the asynchronous nature of the medium access, in which the first Block Ack 112A on channel A occurs simultaneously with the second PPDU 106E on channel B.

To realize the full potential of multi-channel operation, participating devices would ideally be capable of simultaneous bi-directional communication on the multiple channels. With such capability, uplink and downlink communication can occur simultaneously between the AP and the STA in an asynchronous manner. However, a multi-radio device may lack such a capability due to in-device power leakage caused by insufficient frequency separation of the operating channels.

Accordingly, STAs in multi-channel BSS may be classified as a simultaneous transmit-receive (STR) STA or a non-STR STA, The STR STA is capable of STR, simultaneous transmit-transmit (STT), and simultaneous receive-receive (SRR). The non-STR STA is not capable of STR, but is capable of STT and SRR. Accordingly, the non-STR STA cannot detect a PRY preamble or decode a PHY header on channel A when transmitting on channel B.

Figure 2A:
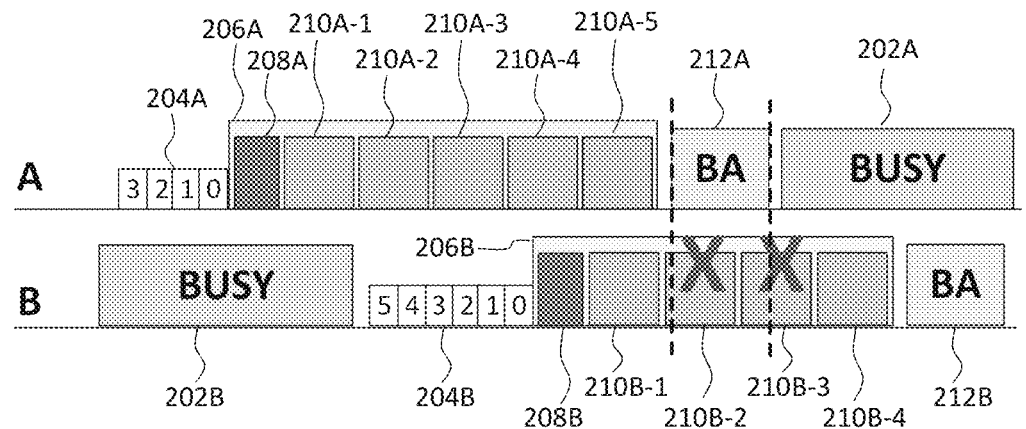
FIGS. 2A-2C are diagrams illustrating simultaneous downlink transmission to a non-STR. STA.

Referring now to FIG. 2A, a diagram illustrates simultaneous downlink transmission to a non-STR STA. An AP having STR capability can receive a Block Ack transmission on channel A even while transmitting to a non-STR STA on channel B.

Reference numerals 202A, 20213, 204A, 204B, 206A, 206B, 208A, 208B, 210A-1 to 210A-5, 210B-1 to 210B-4, 212A, and 212B of FIG. 2 respectively correspond to reference numerals 102A, 102B, 104A, 104B, 106A, 106B, 108A, 108B, 110A-1 to 110A-5, 110B-1 to 110B-4, 112A, and 112B of FIG. 1, which are described above. The transmission of a Block Ack 212A by the non-STR STA on channel A interferes with the downlink data transmission of a PPDU 206B to the same non-STR STA on channel B. As shown in FIG. 2A, only MPDUs being received on channel B that overlap with the Block Ack transmission on Channel A are lost. Specifically, MPDUs 210B-2 and 210B-3 are lost due to the interference.

Figure 2B:
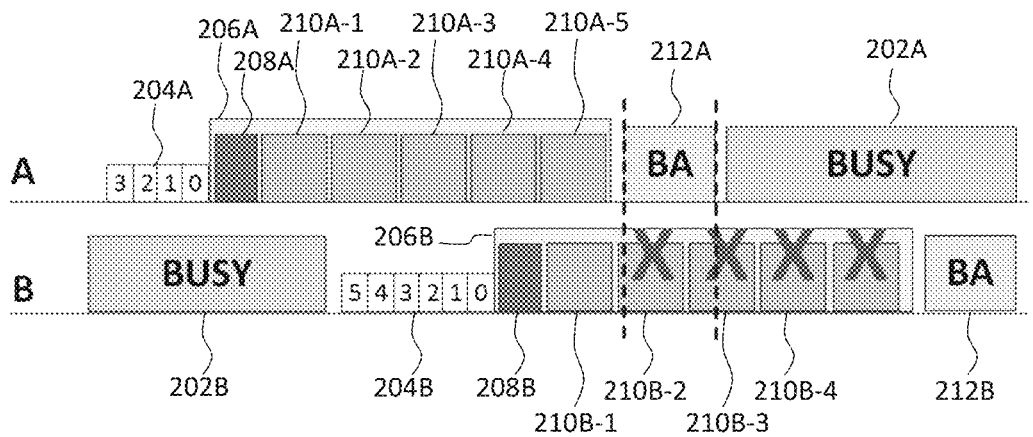

FIG. 2B is a diagram illustrating simultaneous downlink transmission to a non-STR STA. Similar to FIG. 2A, FIG. 2B illustrates the transmission of a Block Ack 212A by a non-STR STA on channel A interfering with a downlink data transmission of a PPDU 206B to the same non-STR STA on channel 13. However, as shown in FIG. 2B, the transmission of the Block Ack 212A on channel A impacts the signal-to-noise-interference ratio on channel B to an extent that reception goes out of sync, leading to reception failure for all MPDUs from the start of the Block Ack transmission to the end of the data transmission. Specifically, MPDUs 210B-2, 210B-3, and 210B-4 are lost due to interference.

Figure 2C:
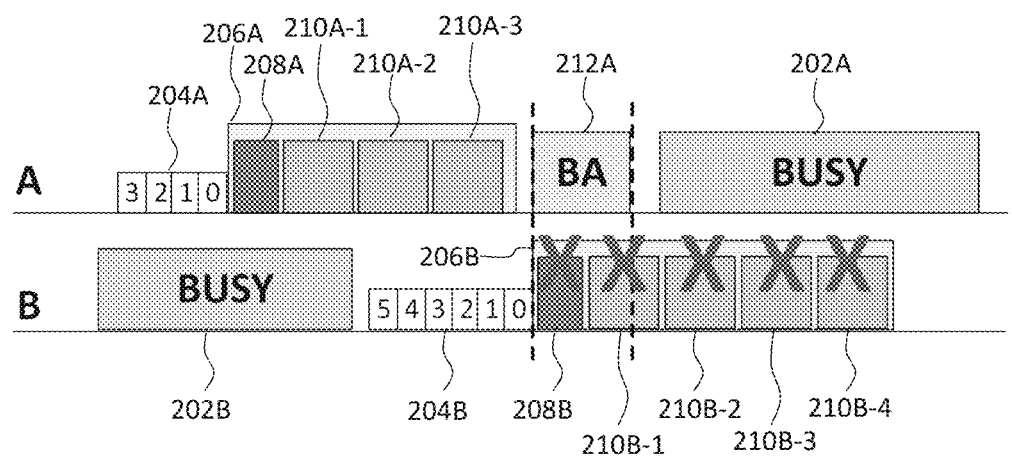

FIG. 2C is a diagram illustrating simultaneous downlink transmission to a non-STR STA. Specifically, FIG. 2C illustrates the transmission of a Block Ack by the non-STR STA on channel A overlapping with the start of a downlink transmission to the non-STR STA on channel B. Specifically, a Block Ack 212A overlaps with a PRY preamble 208B and MPDU 210B-1 of the PPDU 206B. Since the non-STR STA fails to decode the PEW preamble 208B, the non-STR STA fails to receive all of the MPDUs 210B-1 to 210B-4 on channel B, and does not respond with a Block Ack on channel B.

Accordingly, as shown in FIGS. 2A-2C, downlink performance degradation may occur if an AP attempts transmission on a first channel without considering the ongoing frame exchange on a second channel.

As described above, depending on the reception capability of the non-STR STA for the channels of operation, the MPDUs on another channel may not be received beyond the Block Ack transmission phase. Such reception failure would not occur if the AP aligned the endings of the data transmissions on both channels. Consequently, the Block Acks are transmitted on both channels at the same time.

Figure 3:
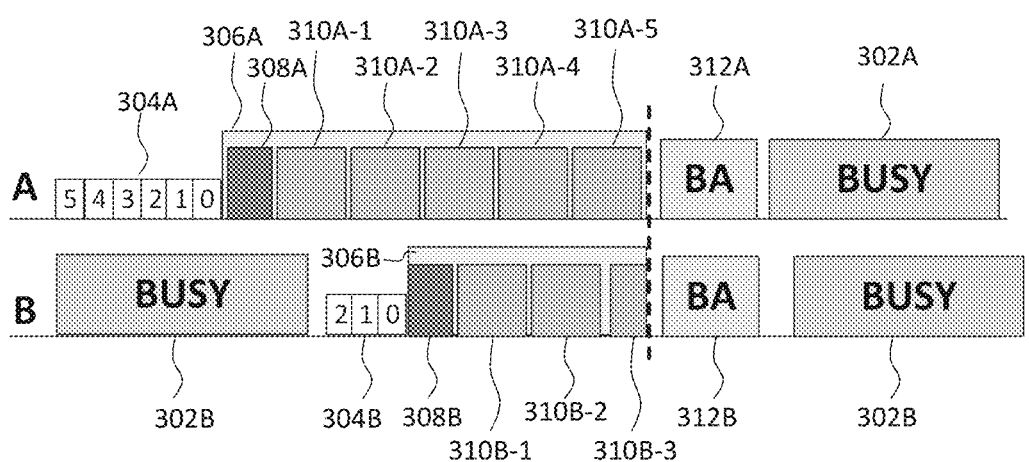
FIG. 3 is a diagram illustrating simultaneous downlink transmission to a non-STR STA with ending alignment, according to an embodiment.

FIG. 3 is a diagram illustrating simultaneous downlink transmission to a non-STR STA with ending alignment, according to an embodiment. Reference numerals 302A, 302B, 304A, 304B, 306A, 306B, 308A, 308B, 310A-1 to 310A-5, 310B-1 to 310B-3, 312A, and 312B of FIG. 3 respectively correspond to reference numerals 102A, 102B, 104A, 104B, 106A, 106B, 108A, 108B, 110A-1 to 110A-5, 110B-1 to 110B-3, 112A, and 112B of FIG. 1, which are described above.

For each pair of channels, the non-SIR STA indicates to the AP whether the AP should always align or may adaptively align endings of simultaneous downlink data transmissions to this non-SIR STA. The non-STR STA may provide this information during the initial association with AP and/or in a dynamic manner after association. For example, the non-SIR STA may indicate its updated requirement whenever the operating parameters of a channel are updated by the AP, since the operating parameters determine the SIR capability and reception capability at the non-STR STA on corresponding pairs of channels.

If the non-STR STA indicates that the AP should always align the endings of the downlink transmission, then the AP will always align simultaneous downlink transmissions to the same non-SIR STA. For example, as shown in FIG. 3, the AP starts transmission of a PPDU 306B to the non-STR STA on channel B immediately after a backoff counter 304B reaches zero, and aligns the end of the PPDU 306B on channel B with the end of an ongoing data transmission of a PPDU 306A to the same non-SIR STA on channel A. In order to achieve this alignment, the AP may employ fragmentation and padding mechanisms known by those skilled in the art.

If the non-STR STA indicates that the AP may adaptively align the downlink transmissions, the AP adaptively aligns the ending of the data transmission based on the potential data reception failure at the non-STR STA if alignment is not performed (e.g. the potential failures shown in FIGS. 2A-2C). Depending on the interference conditions on channel B and the rate adaptation mechanism employed by the AP, the AP determines the modulation and coding rate for the data transmission on channel B. Accordingly, the AP uses knowledge of the start and end times of a potential Block Ack transmission by the non-STR STA on channel A to determine the number of MPDUs that would not be received by the non-SIR STA if the ending of the data transmission on channel B is not aligned with that on channel A. This MPDU reception failure at the non-STR STA may occur on channel A instead of channel B if the data transmission on channel B ends earlier than that of channel A.

Therefore, using a predefined MPDU loss threshold, the AP may align the ending of the data transmission on channel B with that of channel A, if the estimated number of MPDUs that may suffer reception failure at the non-STR STA is greater than or equal to this predefined threshold. Otherwise, the AP may perform transmission on channel B without any alignment with the ongoing transmission on channel A to the same non-SIR STA.

Referring back to FIG. 2C, the uplink Block Ack transmission 212A on channel A overlaps with the PHY preamble of data 208B on channel B, and the entire data transmission on channel B is not received at the non-STR STA. Since the AP reserves the channel A medium for both the data transmission and corresponding acknowledgement reception, the AP has precise knowledge of the start and end time of the potential Block Ack response from the non-SIR STA on channel A. Additionally, the AP has knowledge of the start and end of the PHY preamble corresponding to a potential transmission on Channel B. Therefore, after the backoff counter reaches zero on channel B, if the AP determines an overlap would occur between the Block Ack from the non-STR STA on channel A and the PI-1Y preamble to the same non-STR STA on channel B, the AP will not initiate data transmission on Channel B to the same non-STR STA, and may re-attempt transmission after the reserved medium time on channel A by the AP expires. However, since the AP does not perform transmission, the medium can be obtained by neighboring devices operating on channel B before the reserved medium time on channel A expires. The AP can also choose to transmit to other STAs instead of the same non-STR STA to avoid the issue.

Figure 4:
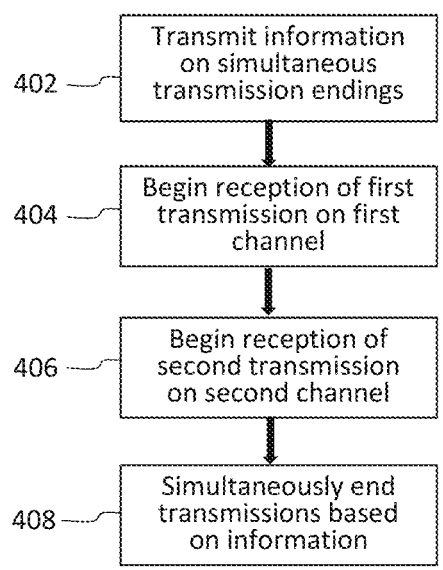
FIG. 4 is a flowchart illustrating a method for receiving simultaneous downlink transmissions at a STA; according to an embodiment.

FIG. 4 is a flowchart illustrating a method for receiving simultaneous downlink transmissions at a STA, according to an embodiment. The STA is a non-STR STA, as described above. At 402, information is transmitted to an AP regarding whether endings of simultaneous data transmissions to the mobile station are to be aligned. The information is transmitted during an initial association between the STA and the AP and/or in a dynamic manner after the initial association. The simultaneous data transmissions are between the AP and the STA over a pair of channels.

At 404, the STA begins reception of a first data transmission, from the AP, on a first channel of the pair of channels. At 406, the STA begins reception of a second data transmission, from the AP, on a second channel of the pair of channels. The second data transmission overlaps at least a portion of the first data transmission. The second data transmission may begin after the first data transmission.

At 408, the STA ends reception of the second data transmission upon an end of the first data transmission, when the information indicates that the endings of simultaneous downlink data transmissions are to be aligned. The second data transmission may be shortened to align its ending with that of the first data transmission.

Figure 5:
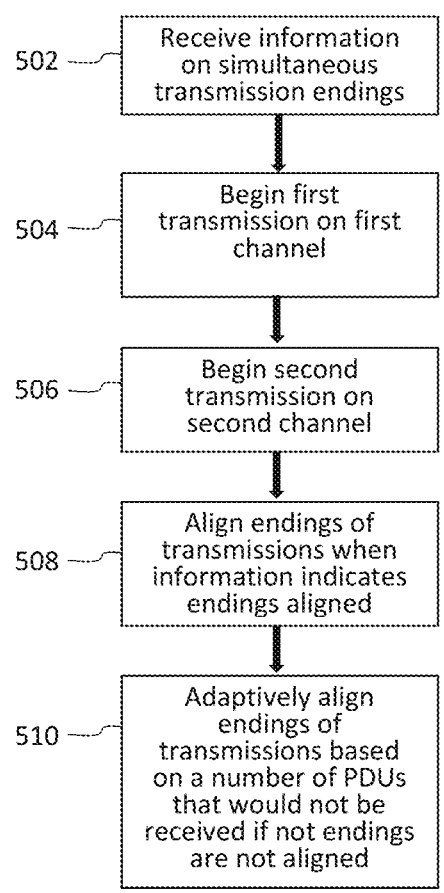
FIG. 5 is a flowchart illustrating a method for transmitting simultaneous downlink transmissions at an AP, according to an embodiment.

FIG. 5 is a flowchart illustrating a method for transmitting simultaneous downlink transmissions at an AP, according to an embodiment. At 502, information is received from a STA regarding whether endings of simultaneous data transmissions to the STA are to be aligned. The simultaneous data transmissions are between the AP and the STA over a pair of channels. The STA is a non-STR STA, as described above. The information is transmitted during an initial association between the mobile station and the AP and/or in a dynamic manner after the initial association.

At 504, the AP begins transmission of a first data transmission, to the STA, on a first channel of the pair of channels. At 506, the AP begins transmission of a second data transmission, to the mobile station, on a second channel of the pair of channels. The second data transmission overlaps at least a portion of the first data transmission. The second data transmission may begin after the first data transmission.

At 508, a second ending of the second data transmission is aligned with a first ending of the first data transmission, when the information indicates that the endings of simultaneous data transmissions are to be aligned. At 510, endings of the first and second data transmissions are adaptively aligned based on a number of packet data units (PDUs) that would not be received if endings are not aligned.

With respect to adaptive alignment, the number of PDUs of the second transmission are determined that would not be received by the STA due to interference with feedback transmitted to the AP on the first channel, should the second data transmission continue without aligning the second ending with the first ending. The number of PDUs is determined based on information at the AP regarding expected transmission times of the feedback and the second transmission. The second ending is aligned with the first ending when the number of PDUs is greater than or equal to a predefined threshold. The transmission of the second downlink data transmission is maintained beyond the first ending, when the number of PDUs is less than the predefined threshold.

Figure 6:
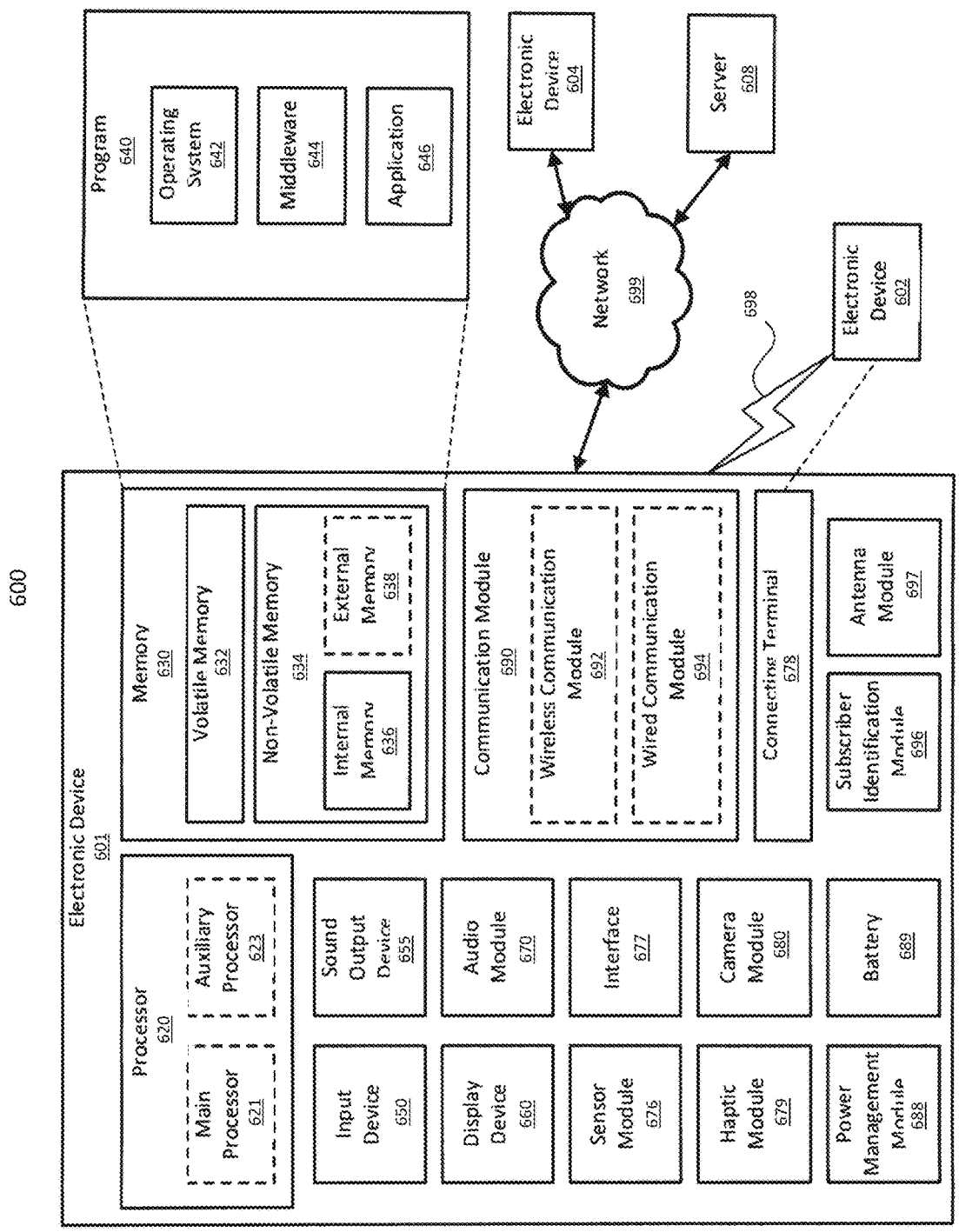
FIG. 6 is a block diagram of an electronic device in a network environment, according to an embodiment.

FIG. 6 is a block diagram of an electronic device in a network environment, according to one embodiment. Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one e.g., the display device 660 or the camera module 680) of the components may be omitted from the electronic device 601, or one or more other components may be added to the electronic device 601, In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by, a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GLASS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696. According to an embodiment of the present disclosure, one or more wireless communication modules 692 may communicate with both a cellular network and a LAN over the second network 699.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for receiving simultaneous downlink transmissions at a mobile station, the method comprising:
    transmitting, to an access point (AP), information indicating that endings of simultaneous data transmissions to the mobile station are to be adaptively aligned based on a data unit loss threshold, wherein the simultaneous data transmissions are between the AP and the mobile station over a pair of channels;
    beginning reception of a first data transmission, from the AP, on a first channel of the pair of channels;
    beginning reception of a second data transmission, from the AP, on a second channel of the pair of channels, wherein the second data transmission overlaps at least a portion of the first data transmission; and
    ending reception of the second data transmission upon an end of the first data transmission when endings are aligned based on the data unit loss threshold.

2. The method of claim 1, wherein the mobile station is not capable of simultaneous transmit-receive over the pair of channels, but is capable of simultaneous transmit-transmit and simultaneous receive-receive over the pair of channels.

3. The method of claim 1, wherein the information is transmitted during at least one of an initial association between the mobile station and the AP or in a dynamic manner after the initial association.

4. The method of claim 1, wherein the reception of the second data transmission begins after the reception of the first data transmission.

5. The method of claim 1, wherein ending reception of the second data transmission comprises shortening the second data transmission such that an end of the second data transmission aligns with the end of the first data transmission.

6. A method for transmitting simultaneous downlink transmissions at an access point (AP), the method comprising:
    receiving, from a mobile station, information indicating that endings of simultaneous data transmissions to the mobile station are to be adaptively aligned, wherein the simultaneous data transmissions are between the AP and the mobile station over a pair of channels;
    beginning transmission of a first data transmission, to the mobile station, on a first channel of the pair of channels;
    beginning transmission of a second data transmission, to the mobile station, on a second channel of the pair of channels, wherein the second data transmission overlaps at least a portion of the first data transmission;
    determining that endings of the first data transmission and the second data transmission are to be adaptively aligned based on a data unit loss threshold; and
    aligning a second ending of the second data transmission with a first ending of the first data transmission.

7. The method of claim 6, wherein determining that endings of the first data transmission and the second data transmission are to be adaptively aligned comprises:
    determining that a number of packet data units of the second data transmission that would not be received by the mobile station due to interference with feedback transmitted to the AP on the first channel should the second data transmission continue without aligning the second ending with the first ending, is greater than or equal to the data unit loss threshold.

8. The method of claim 7, wherein the number of packet data units is determined based on information at the AP regarding expected transmission times of the feedback and the second transmission.

9. The method of claim 6, wherein the mobile station is not capable of simultaneous transmit-receive over the pair of channels, but is capable of simultaneous transmit-transmit and simultaneous receive-receive over the pair of channels.

10. The method of claim 6, wherein the information is received during at least one of an initial association between the mobile station and the AP or in a dynamic manner after the initial association.

11. The method of claim 6, wherein the transmission of the second data transmission begins after the transmission of the first data transmission.

12. The method of claim 6, wherein aligning the second ending with the first ending comprises shortening the second data transmission.

13. A mobile station, comprising:
    a processor; and
    a non-transitory computer readable storage medium storing instructions that, when executed, cause the processor to:
        transmit, to an access point (AP), information indicating that endings of simultaneous data transmissions to the mobile station are to be adaptively aligned based on a data unit loss threshold, wherein the simultaneous data transmissions are between the AP and the mobile station over a pair of channels;
        begin reception of a first data transmission, from the AP, on a first channel of the pair of channels;
        begin reception of a second data transmission, from the AP, on a second channel of the pair of channels, wherein the second data transmission overlaps at least a portion of the first data transmission; and
        end reception of the second data transmission upon an end of the first data transmission when endings are aligned based on the data unit loss threshold.

14. The mobile station of claim 13, wherein the mobile station is not capable of simultaneous transmit-receive over the pair of channels, but is capable of simultaneous transmit-transmit and simultaneous receive-receive over the pair of channels.

15. The mobile station of claim 13, wherein the information is transmitted during at least one of an initial association between the mobile station and the AP or in a dynamic manner after the initial association.

16. The mobile station of claim 13, wherein in ending reception of the second data transmission, the instructions cause the processor to shorten the second data transmission such that an end of the second data transmission aligns with the end of the first data transmission.

17. An access point (AP), comprising:
a processor; and
a non-transitory computer readable storage medium storing instructions that, when executed, cause the processor to:
  receive, from a mobile station, information indicating that endings of simultaneous data transmissions to the mobile station are to be adaptively aligned, wherein the simultaneous data transmissions are between the AP and the mobile station over a pair of channels;
  begin transmission of a first data transmission, to the mobile station, on a first channel of the pair of channels;
  begin transmission of a second data transmission, to the mobile station, on a second channel of the pair of channels, wherein the second data transmission overlaps at least a portion of the first data transmission;
  determine that endings of the first data transmission and the second data transmission are to be adaptively aligned based on a data unit loss threshold; and
  align a second ending of the second data transmission with a first ending of the first data transmission when the information indicates that the endings of simultaneous data transmissions are to be aligned.

18. The AP of claim 17, wherein, in determining that the endings are to be adaptively aligned, instructions, when executed, further cause the processor to:
  determine that a number of packet data units of the second data transmission that would not be received by the mobile station due to interference with feedback transmitted to the AP on the first channel should the second data transmission continue without aligning the second ending with the first ending, is greater than or equal to the data unit loss threshold.

19. The AP of claim 18, wherein the number of packet data units is determined based on information at the AP regarding expected transmission times of the feedback and the second transmission.

20. The AP of claim 18, wherein the mobile station is not capable of simultaneous transmit-receive over the pair of channels, but is capable of simultaneous transmit-transmit and simultaneous receive-receive over the pair of channels.

* * * * *